US005565240A

United States Patent [19]

Smith

[11] Patent Number: 5,565,240

[45] **Date of Patent: *Oct. 15, 1996**

[54] PROCESS FOR PRODUCING POWDER COATED PLASTIC PRODUCT

[75] Inventor: Dwight E. Smith, Columbus, Miss.

[73] Assignee: Sanderson Plumbing Products, Inc., Columbus, Miss.

[ * ] Notice: The term of this patent shall not extend beyond the expiration date of Pat. No. 5,344,672.

[21] Appl. No.: 295,029

[22] Filed: Aug. 25, 1994

Related U.S. Application Data

[63] Continuation-in-part of Ser. No. 882,901, May 14, 1992, Pat. No. 5,344,672.

[51] Int. Cl.[6] .............................. B05D 1/06; B05D 3/02; B32B 27/10

[52] U.S. Cl. ......................... 427/195; 427/202; 427/470; 427/485; 428/481

[58] Field of Search .................................... 427/195, 202, 427/316, 317, 408, 470, 485; 428/413, 481

[56] References Cited

U.S. PATENT DOCUMENTS

| | | | |
|---|---|---|---|
| Re. 32,261 | 10/1986 | Hirote et al. | 525/285 |
| T982,004 | 5/1979 | Klusendorf et al. | 428/339 |
| 2,888,362 | 5/1959 | Starkey | 427/470 |
| 3,106,769 | 10/1963 | Goethe et al. | 29/155.56 |
| 3,183,113 | 5/1965 | Gemmer | 427/185 |
| 3,184,527 | 5/1965 | Fischer | 264/255 |
| 3,514,308 | 5/1970 | Scott, Jr. et al. | 427/185 |
| 3,632,383 | 1/1972 | Dominick et al. | 427/285 |
| 3,708,321 | 1/1973 | Spieles | 427/470 |
| 3,770,482 | 11/1973 | Miller et al. | 427/470 |
| 3,953,623 | 4/1976 | Das | 427/189 |
| 3,953,644 | 4/1976 | Camelon et al. | 428/220 |
| 4,012,363 | 3/1977 | Brüning et al. | 427/195 |
| 4,246,298 | 1/1981 | Guarnery et al. | 427/386 |
| 4,286,021 | 8/1981 | Brendley, Jr. | 428/413 |
| 4,373,219 | 2/1983 | Garasi et al. | 4/300 |
| 4,402,983 | 9/1983 | Craven | 428/335 |
| 4,567,106 | 1/1986 | Sano et al. | 428/413 |
| 4,727,111 | 2/1988 | Pettit, Jr. et al. | 525/190 |
| 4,737,403 | 4/1988 | Simpson et al. | 428/273 |
| 4,758,450 | 7/1988 | Czech et al. | 427/185 |
| 4,774,102 | 9/1988 | Kiefer et al. | 239/3 |
| 4,859,760 | 8/1989 | Light Jr., et al. | 528/45 |
| 4,885,187 | 12/1989 | Koenig | 427/195 |
| 4,906,529 | 3/1990 | Brundbjerg et al. | 428/552 |
| 5,008,335 | 4/1991 | Pettit, Jr. | 525/111 |
| 5,021,297 | 6/1991 | Rhue et al. | 428/430 |
| 5,338,578 | 8/1994 | Leach | 427/470 |
| 5,344,672 | 9/1994 | Smith | 427/470 |

FOREIGN PATENT DOCUMENTS

| | | |
|---|---|---|
| 0353932 | 2/1990 | European Pat. Off. . |
| 0372740 | 6/1990 | European Pat. Off. . |
| 0404752 | 12/1990 | European Pat. Off. . |
| 0408465 | 1/1991 | European Pat. Off. . |
| 1055759 | 1/1967 | United Kingdom . |
| 2042930 | 10/1980 | United Kingdom . |
| 2061552 | 5/1981 | United Kingdom . |

OTHER PUBLICATIONS

"User's Guide to Powdercoating," 2nd Ed., Miller, Ed, Society of Manufacturing Engineers Publications Dept., pp. 103 and 138–139 (1987).

*Primary Examiner*—Shrive Beck
*Assistant Examiner*—Fred J. Parker
*Attorney, Agent, or Firm*—Popham, Haik, Schnobrich & Kaufman, Ltd.

[57] ABSTRACT

Plastic substrates, such as but not limited to phenolic cellulosic composites such as those used in conventional toilet seats, are heated at a temperature and for a time sufficient to degas the substrate, and are then coated with a powder, and heated to cure the powder coating. In a preferred embodiment, a water-based electrically conductive coating is first applied to a phenolic cellulosic composite, and cured while the substrate is heated to degas the substrate sufficiently, such that a subsequently applied powder coating will not suffer from popping during curing. In a preferred embodiment, the part is coated at a temperature below the cure temperature of the coating composition.

18 Claims, 1 Drawing Sheet

PROCESS FOR PRODUCING POWDER COATED PLASTIC PRODUCT

This is a continuation-in-part of U.S. Pat. application Ser. No. 07/882,901, filed May 14, 1992, now U.S. Pat. No. 5,344,672.

FIELD OF THE INVENTION

This invention relates to coated plastics and methods of coating plastic substrates with a powder coating, and to articles resulting therefrom. The invention is particularly, although not exclusively, directed to coating plastics and fiber reinforced plastics and composites, such as phenolic cellulosic composites, with a water-based conductive coat and a powder composition to produce articles such as powder coated toilet seats and covers.

BACKGROUND OF THE INVENTION

Proper coating of many articles of manufacture is important to provide a desired function, give a pleasing aesthetic appearance, or to achieve protection against wear or the environment. Thermosetting plastic powder compositions are among many different coating materials that have been used on articles for these purposes as disclosed, for example, by a U.K. Patent Application GB2042930A (published Oct. 1, 1980) and a U.S. Pat. 3,953,644 (Camelon et al). These powder coatings are typically sprayed or otherwise applied to the article substrate and then heated to cure the powder into a hardened surface finish. However, it is difficult to obtain smooth finish coatings on plastics, plastic composites and fiber-reinforced plastic substrates which are porous and/or contain entrapped air and/or other volatile materials. This is due to a problem, known as "popping", which is believed to occur by release of volatile materials which erupt through the coating during heat curing of the coating.

Patents and other documents mentioned herein are incorporated by reference as if reproduced in full below.

Another problem in coating plastics and fiber reinforced plastic substrates is the need to substantially reduce hazardous Volatile Organic Compounds (VOCs), especially since the recent passage in 1990 of amendments to the Federal Clean Air Act (P.L. 101–549) which require such reductions. This need is particularly important where the application of a powder coating composition to a substrate is by electrostatic spraying, which also involves first applying a conductive paint to non-conductive substrates prior to coating with a powder composition. A solvent-based conductive paint typically has been used for this purpose, especially where the substrate is a wood fiber-reinforced plastic such as a phenolic cellulosic composite. However, a solvent-based conductive product has high emission levels of VOCs, such as xylene. The Clear Air Act Amendments of 1990 include xylenes (i.e., o-xylenes, m-xylenes and p-xylenes) on the list of hazardous air pollutants (HAPs) from stationary industrial sources whose emissions are or will be reduced by federal regulations.

Thus, it is and will be necessary to coat plastics and fiber reinforced plastic substrates using methods which will yield lower VOC (particularly xylene) emissions than the methods involving solvent-based conductive paints and/or conventional solvent based top coatings.

SUMMARY OF THE INVENTION

One aspect of the present invention is directed to processes for minimizing the extent of popping in the coating of a plastic substrate, particularly a preformed fiber-reinforced substrate, by degassifying and by sealing its porosity. This is accomplished by preheating the substrate to degassify or rid it of volatile materials before a thermosetting powder coating composition is applied to the substrate. Such degassing is performed by exposing the substrate to a temperature above the powder cure temperature for a long enough time to drive out the substrate's volatile materials sufficiently to prevent popping of a subsequently applied coating; note that by elimination of popping, it is meant that popping which is visible to an unaided human eye is eliminated, although it is possible that closer inspection may reveal tiny surface defects which do not interfere with the aesthetic appearance and smoothness of the surface required by conventional standards.

One process embodiment then requires that, after this preheat degassing is concluded but while the substrate's temperature remains higher than the powder cure temperature, the powder is applied to coat the substrate, which then is immediately heated to or maintained at a temperature and for a time sufficient to cure the powder coating on the substrate. In developing this process embodiment, thermogravimetric analysis, TGA, experiments were performed on cellulose phenolic composite samples, such as those used in conventional toilet seats (otherwise known as a resin/wood flour substrate). It was discovered that the cellulose phenolic composite degassed and reabsorbed water reversibly, with reabsorbed water following the original gassing pattern on repeated TGA experiments. The amount of water driven off in an isothermal TGA was found to be incremental with temperature; a 280° F. (140° C.) bake will drive off between about 2.5 and 3.7% of the initial sample weight, while a 375° F. (190° C.) bake will drive off 3.7–4.2% of the initial sample weight. The weight loss at a maximum temperature was found to be independent of the rate of heating.

Water was found to be immediately reabsorbed into unprimed and primed substrates upon removal from heat. TGA showed a 20–30% recovery of weight lost in one hour for small samples of unprimed substrate. Recovery of water into primed substrates depended on the primer thickness. In experiments performed using a Dupont 990/950 thermogravimetric analyzer with a dry air flow, the identity of effluent gas from cellulosic phenolic composite samples was confirmed to be water with a slight trace of organics; this was based on an infrared analysis of dry ice/acetone (spectrum GN4-40A) and liquid nitrogen (spectrum GN4-40B) traps, and on the lack of substrate recovery if placed in dry air.

From the foregoing TGA experiments, it was clear that, in order to avoid popping, plastic substrates have to be heated sufficiently to remove sufficient volatile compounds, which appear to be primarily water in the case of cellulose phenolic composites, to prevent further degassing during subsequent coating and curing. Therefore, it appeared necessary to heat the substrate to a temperature and for a time sufficient to substantially degas the substrate, and to maintain the substrate at a temperature above which the vaporized components would be reabsorbed while coating the substrate.

Since isothermal TGA experiments demonstrated that the percent weight loss from a solid sample is proportional to the isothermal temperature (i.e., the higher the temperature, the greater the amount of degassing), it was believed necessary to preheat the substrate to a temperature and for a time sufficient to degas the substrate, with the preheat temperature being above or equal to the cure temperature of the coating to be subsequently applied, and then to immediately apply a thermosetting powder coating composition to the preheated substrate, without allowing the substrate temperature to drop below the temperature sufficient to cure the thermosetting powder, and immediately curing the coating. It was believed this was necessary, since applying of the powder to a substrate at a temperature beneath the cure temperature of the coating, and subsequently elevating the temperature of the substrate with the coating thereon to cure the coating, would result in further degassing, leading to popping.

A second and equally important purpose of the present invention is to reduce VOC emission levels in connection with the electrostatic coating of powder on plastic substrates, particularly those substrates made of phenolic cellulosic composites which are wood fiber-reinforced materials and, specifically, materials used to form conventional toilet seats and covers, such as, by way of non-limiting example, the various composites used by SANDERSON PLUMBING PRODUCTS, INC., of Columbus, Miss. and other toilet seat manufacturers.

Surprisingly, it has been discovered that the application of a water-based conductive paint coating, rather than a solvent-based conductive coating, to a wood fiber-reinforced plastic substrate does not cause the substrate to swell unacceptably or to raise its grain in an undesirable way. Thus, a water-based conductive paint unexpectedly permits a surface powder coating to have all of the desirable attributes obtained from use of a solvent-based conductive coating without the environmental drawbacks of the latter, since a water-based coating has a much lower VOC emission rate. For example, water-based conductive paints typically have VOC emission rates of only about 0.5 pounds per gallon as compared to about 6 pounds per gallon of VOCs which are emitted from many solvent-based conductive coatings. When it is also considered that powder coating compositions generally have little or no VOC emissions, the combination of a powder coating over a water-based conductive coating on a substrate is highly desirable and beneficial in meeting low VOC requirements. An unforeseen benefit is that the powder coating has better adhesion to the water-based conductive coating than to the solvent-based conductive coating, as shown by the standard cross-hatch adhesion test.

It also has been surprisingly found that acceptable results are achieved if the powder coating is electrostatically sprayed over the water-based coating while the substrate temperature is substantially below the cure temperature of the powder coating. In a preferred embodiment, the temperature of the degassed/preheated substrate is above the melting temperature of the powder coating, but below the cure temperature, prior to application of the powder.

For example, if the powder melt temperature is 190° F. and the powder cure temperature is 290° F., the degassed part would be coated while at a temperature of greater than 190° F., but lower than 290° F. This results in energy savings, since there is no need to maintain the preheated part at a temperature above the cure temperature prior to and during coating.

It is believed that a water-based conductive coating has a superior chemical affinity for wood and thus adheres well to wood by soaking into the wood. This characteristic permits a better flow of powder over the water-based paint, with lesser amounts of powder needed for proper coverage of the entire substrate surface including corners, and it avoids or minimizes certain problems associated with wood fiber-reinforced plastic substrates (such as the appearance of wood striations) when a solvent-based paint undercoat is used instead. A water-based conductive coating also may be more resistant to moisture penetration.

Accordingly, it is a primary object of the present invention to provide a method of coating plastic substrates that will yield a smooth surface appearance, together with the articles coated thereby.

It is a further object of the present invention to produce coated plastic substrates in an environmentally safe manner by combining a water-based conductive paint undercoating and a powder top coating composition which yield low VOC emissions.

These and other objects are generally achieved in one embodiment of the invention by applying a conductive paint coating, preferably water-based, to a plastic substrate surface, heating this substrate at a temperature and for a time sufficient to cure the conductive coating thereon, applying a powder coating composition over said cured conductive coating on the substrate while the substrate surface temperature is below the powder cure temperature, and heating the powder coated substrate at a temperature and for a time to cure the powder coating composition. In some cases an initial preheating of the substrate is performed to warm the substrate surface before the conductive coating is applied. It can also be noted that, due to factors such as cost and appearance, it is sometimes desirable that the plastic substrate not be coated with metal-containing layers.

In another embodiment of the invention, the plastic substrate, which can be formed of, by way of non-limiting examples, cellulose-phenolic composites, and sheet molding compound (SMC) and bulk molding compound (BMC) formed from resins, such as polyesters, epoxies and phenolics, is preheated at a temperature above the cure temperature of a subsequently applied powder coating composition and for a time sufficient to degas the substrate, then a powder coating composition is immediately applied to the preheated substrate which remains at a temperature above the powder cure temperature, and the substrate is immediately heated at a temperature and for a time sufficient to cure the powder.

DETAILED DESCRIPTION OF THE PREFERRED EMBODIMENTS

Figure 1:
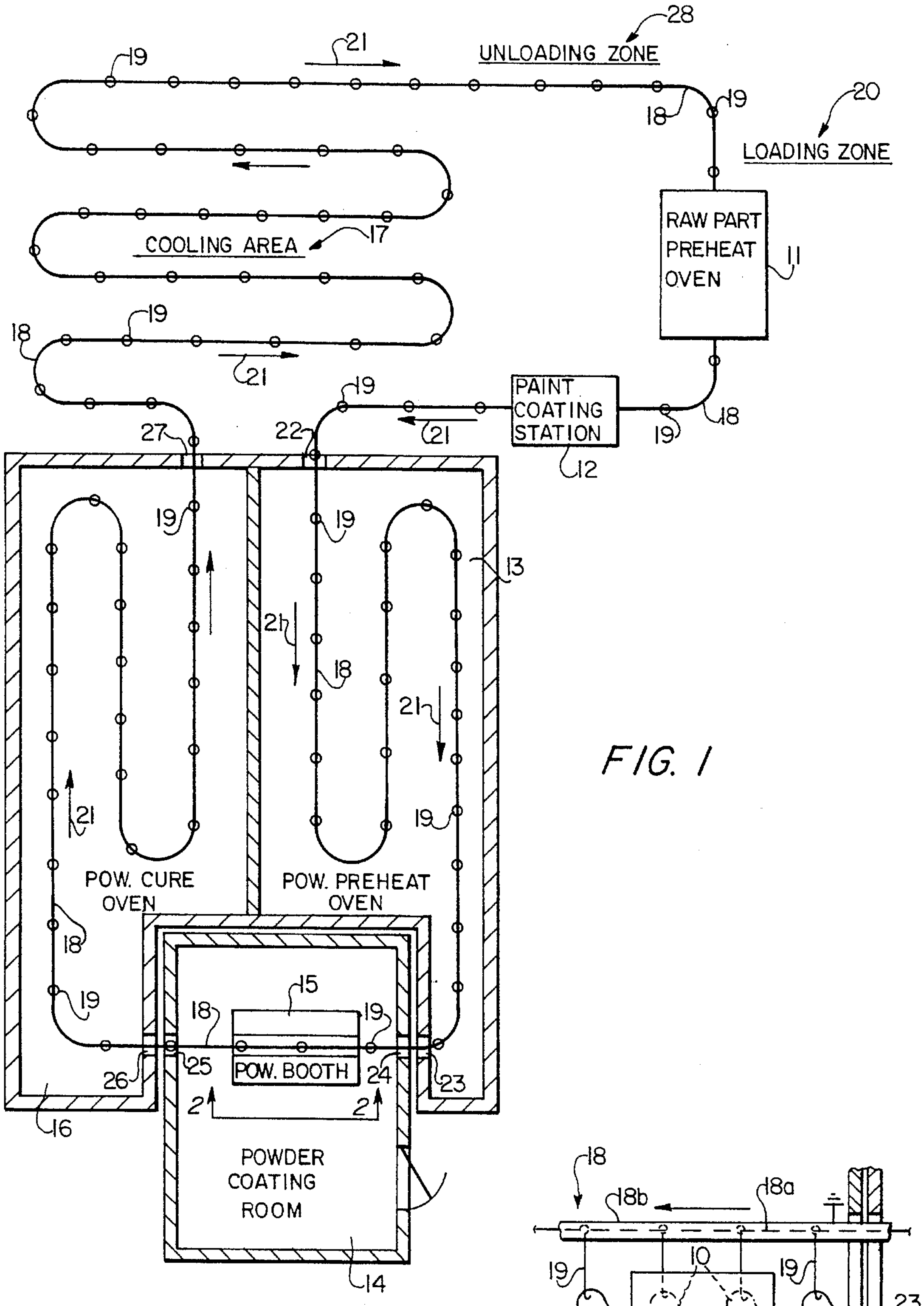
FIG. 1 is a partially cut-away plan view of a preferred powder coating line facility for performing the present invention.

In describing the preferred embodiments of the subject invention, specific terminology is used for the sake of clarity. However, the invention is not intended to be limited to the specific terms so selected, and each specific term includes all technically equivalent terms for steps or devices operating in a similar manner to accomplish a similar purpose.

Powder Coating Compositions

A number of powder coating compositions known in the art, such as thermosetting powder coating compositions, can be used in the methods of the invention. One preferred example is an epoxy polyester hybrid thermosetting powder composition identified as No. FA050V White, produced by the Courtaulds Coatings company of Houston, Tex. This Courtaids powder has a melting temperature of around 140–160° F., and a cross-linking or cure temperature of around 295°–300° F., which should be maintained for at least 24 minutes to effect a complete cure. The cure of thermosetting powder coatings is measured by the resistance of the coating to a solvent. Typically, the Courtaids FA050V White powder after being completely cured will withstand up to about fifty double rubs using methyl ethyl ketone (MEK) solvent without rubbing through to a substrate. This is considered to be a satisfactory surface for most purposes. A double rub is a rub back and forth with a solvent-saturated cloth using normal hand-applied pressure.

One or more additional preferred thermosetting epoxy polyester hybrid powder compositions which can also be employed are produced by the Sheboygan Paint Company (SPC) of Cedartown, Ga. One such composition has a SPC product No. XHW-169. This powder has a melting temperature of around 192° F., and a cross-linking or cure temperature of about 310° F. which should be maintained for at least 28 minutes. It can withstand up to about 50 MEK double rubs after completely curing.

Other powder compositions that may be used in the present invention also include those specified, for example, in the aforementioned U.S. Pat. No. 3,953,644, U.S. Pat. No. 4,727,111, and Reissue Pat. No. 32,261.

Substrates

The substrates which are particularly suitable for coating by the present invention are preformed plastic substrates, especially those made of a phenolic cellulosic composite which is a preferred material. A preferred embodiment of the process is particularly, although not exclusively, useful with preformed phenolic cellulosic composites comprised of (1) pine, hard wood, and dry resin; and (2) pine and dry resin. Both of these composites have been used or tested in connection with, for example, the manufacture of toilet covers and seats. The process is also useful with other preformed plastic substrates containing different fibers, such as but not limited to fiber glass-reinforced polyester substrates, or with substrates having no fiber reinforcement, and including thermosetting and thermoplastic substrates which release gas when heated. It is believed that sheet and bulk molding compounds may also be used, such as those described in U.S. Pat. No. 3,184,527 and those described in various plastics and chemical encyclopedias.

Conductive Coatings

In regard to the properties of a water-based conductive paint coating for use in the subject method, other than having low VOC emission levels, which such coatings inherently exhibit, it is desirable that this coating also produce as low a swelling or grain raising effect as is possible when applied to wood-containing plastic substrates, such as phenolic cellulosic composites used in conventional toilet seats and covers. Preferred water-based conductive paint coatings suitable for such use include those available from the aforementioned SHEBOYGAN PAINT COMPANY (SPC), particularly SPC products No. 71–351 (Aqua Grey Conductive Primer) and No. 71-353A (Aqua Conductive Primer). Both SPC water-based conductive primers comprise an aqueous suspension of a water-soluble acrylic polyester resin with carbon black particles. Other similar water-based conductive paints can be utilized in carrying out the subject method, such as, for example, those specified in the aforementioned U.S. Pat. No. 3,953,644.

Facilities

Figure 2:
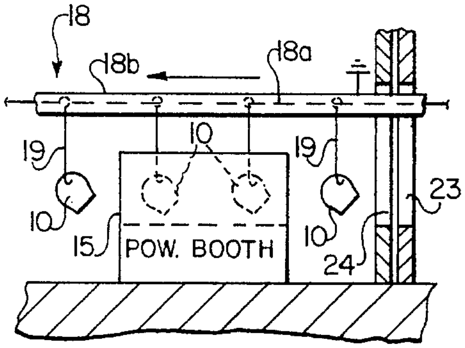
FIG. 2 is a partially cut-away elevation view of a powder coating room within the facility illustrated in FIG. 1.

FIG. 1 is a partially cut-away plan view of a preferred powder coating line facility for continuously performing at least one method of the present invention. FIG. 2 is a partially cut-away elevation view of the powder coating room within this facility which also shows several plastic substrates 10 being coated therein. The major locations at this facility comprise an optional raw substrate part preheat station 11 for initially warming at least the surface of each raw (unfinished) plastic substrate 10 (if necessary), a paint coating station 12 for applying a water-based conductive coating to these raw substrates, a powder preheat oven 13 for drying or curing the water coating on the substrate part 10 and for degassing and heating the part to prepare it for later coating with powder, a powder coating room 14 containing a booth 15 for electrostatically applying powder over the conductive paint coating on each heated substrate 10 passing therethrough, a powder cure oven 16 for curing the powder coating on each substrate, and a cooling area 17 in which the hot cured powder coated substrate parts 10 from oven 16 are given time to cool down.

In FIG. 1, the single heavy line 18 is symbolic of a continuous overhead conveyor system along which the substrates 10 are spaced and also are suspended by means such as vertically hanging hooks 19 connected to the moving conveyor. After each raw substrate part 10 is attached to a separate hook 19 at a loading zone 20, the moving conveyor 18 transports each part sequentially through the aforedescribed locations in the directions shown by arrows 21, so that each part can be appropriately processed at each location. The conveyor 18 enters oven 13 through a wall opening 22 and exits therefrom through a wall opening 23. Similarly, the conveyor enters room 14 through a wall opening 24 and leaves through wall opening 25. In like fashion, the powder cure oven wall opening 26 admits the conveyor 18 which later exits oven 16 via wall opening 27. In the powder preheat oven 13 and the powder cure oven 16, conveyor 18 is usually laid out in a pattern of loops to allow sufficient conveying time within these ovens for the substrate part surface to reach and maintain the necessary temperatures. These ovens 13 and 16 also include fans (not shown) to circulate the heated air to avoid formation of hot spots.

As best seen in the powder coating room elevation view of FIG. 2, the conveyor 18 includes an electrically grounded conveyor chain or belt **18*a* which is movably supported by and guided within an inverted U-shaped channel member 18*b* that is attached to an appropriate overhead structure. The grounded conductive hooks 19 hang from this conveyor chain 18*a* and carry the plastic substrate parts 10, here represented as being toilet covers, through this powder coating room 14 and the other locations of the facility. After cooling in area 17, the powder coated parts 10 are removed from hooks 19 in the unloading zone 28**.

Powder coating room 14 also contains a booth 15 for electrostatically applying the powder to each heated substrate part 10 as it is carried by a hook 19 from oven 13 and through the center of the booth. This powder application may be accomplished through side openings (not shown) in the booth 15 by either a manually-held spray gun or by automatically-controlled spray guns. Commercially-available electrostatic coating apparatus suitable for this purpose can be obtained from the Nordson Corporation of Amherst, Ohio, particularly its Model NHC-4 Powder Spray Booth and related equipment.

Description of Methods

First Embodiment

First to be described with reference to FIGS. 1 and 2 is the method in which a water-based conductive coating is applied to the substrate 10 before application of the powder composition.

If the surface temperature of a raw unfinished substrate 10 is below about 70°–80° F. because of the environment to which it has been exposed prior to the coating process, it may first be advantageous to preheat the raw substrate at station 11 in order to at least warm its surface above the ambient temperature. This preheating may be especially desirable if the substrate is a wood-containing part made, for example, of a phenolic cellulosic composite. A relatively cool part surface of this material may prevent the water-based conductive paint from soaking into the wood composite as well as it should in order to sufficiently prime the part for deriving the full benefits from the use of a water-based product. Raising of the surface grain may also be minimized or eliminated by warming the part surface before the water-based paint is applied thereto.

Moreover, the subsequent additional heating of the water-coated part 10 in powder preheat oven 13 may not fully dry or cure the water paint if it has been applied on too cool a surface. An initial preheating of the raw substrate part 10 at station 11 will also assist in the degassification of the part which is primarily done in oven 13. The raw part preheat station 11 preferably should be able to heat the substrate surface to a temperature between 100° F. and 140° F. This heating may be done in a conventional oven or by other means at station 11, such as by infrared heaters for surface warming only. However, care must be taken not to overheat the raw substrate since this may impair the flow of the water-based paint over the substrate which in turn could reduce gloss and have other deleterious effects.

After the raw substrate part 10 has been preheated (if necessary), the water-based conductive coating is applied thereto at paint station 12 and then is dried or cured on the part in the powder preheat oven 13. The paint station 12 can include well known flowcoat painting apparatus comprised of spray nozzles and fans, but other means or even hand-dipping may be used to apply the water-based conductive paint to each part 10. An ohmmeter is usually used to measure this coating's resistance between two prongs for determining when the coating is thick enough to provide a satisfactory grounded conductive surface on to which powder can later be electrostatically sprayed in the powder coating booth 15.

The powder preheat oven 13 is maintained at a temperature high enough so that when the water-coated substrate part 10 enters this oven on conveyor 18 from station 12, the part surface temperature will rise to a value that will dry or cure the water-based coating thereon and also will degassify the substrate while the part travels through oven 13. This combined curing of the water-based conductive paint and degassing of the substrate in oven 13 is also advantageous since the substrate processing time is considerably reduced. The time required for the substrate surface temperature to reach or exceed the water-based paint cure temperature in oven 13 also depends on the surface temperature of the substrate when it arrives from paint station 12, which in turn depends on whether an initial raw part preheating step was performed at station 11. The final temperature of the substrate surface (or of the substrate interior) in oven 13 also should be sufficiently high when the substrate leaves oven 13 so that the powder will melt on the substrate surface when later applied in powder coating booth 15. However, the substrate temperature in booth 15 may be lower than the powder cure temperature because the part temperature will fall during the substrate's travel between oven 13 and booth 15.

Accordingly, in one preferred implementation of the invention for powder coating toilet covers and seats made from a phenolic cellulosic composite, the powder preheat oven 13 is maintained at a temperature of about 355°–385° F. while each part enters therein, and remains in the oven for about 27 to 29 minutes as determined by the conveyor speed and its travel distance within the oven. This exposure time to the oven heat will raise the substrate surface temperature long enough to completely cure the water-based coating thereon and to sufficiently degassify the substrate so as to avoid popping of a subsequently applied powder coating applied in accordance with this invention. Moreover, the surface temperature of the part as it leaves oven 13 is also high enough to prevent the part surface or part interior temperatures from falling so low at the booth 15 that the powder will not melt when later sprayed on the part at said booth. However, if the part spends less than about 22 minutes in the 355° F. oven 13, it is possible that its temperature will not become high enough to accomplish the aforementioned objectives.

As noted above in connection with the particular implementation of the invention under discussion, the surface temperature of the substrate part 10 is about 350° F. when it leaves the powder preheat oven 13 through opening 23 and enters room 14 through the entrance opening 24. Because the temperature of room 14 is typically held at about 70° F. to 80° F., the part surface temperature will quickly fall to a much lower value than 350° F. by the time the part reaches coating booth 15, which is a short distance away from the oven 13. However, when the still hot substrate enters booth 15, its surface temperature (or the internal temperature of the part) should still be of a value to cause the sprayed powder composition to melt over the part surface. However, this lower part temperature need not be nearly as high as the powder's cure temperature.

Although preferred temperatures and times have been provided, it is to be understood that other production facilities can use higher temperatures for a shorter period of time or a lower temperature for a longer period of time to achieve correct heating and degassifying of parts.

In one embodiment, preheated/degassed parts are powder coated within two (2) minutes of removal from a preheat oven to prevent excessive reabsorption of water and other volatiles which could revaporize and cause popping during subsequent coating and curing.

In another embodiment, preheated/degassed cellulosic phenolic composite parts are cooled and stored in a low humidity storage area for more than two minutes, hours, days or even longer (depending on the humidity in the storage area, and on conductive coating thickness, if any), and subsequently heated to or above the melt temperature of a powder coating composition and then powder coated and cured; cooling and storage of the preheated/degassed parts in a low-humidity environment can extend the time between preheating/degassifying and coating/curing without significant popping occurring in the resulting powder coating. For certain substrates, if popping does occur in a subsequently applied powder coating, it may be necessary to maintain the part temperature near or above the powder cure temperature before and during powder applications to minimize popping, although in a preferred embodiment, this is not necessary.

The powder coat is applied to the moving part 10 in booth 15 by electrostatic means, where it melts (but does not cure) to cover and adhere to the previously cured water-based conductive coating on the substrate surface. This melting of the powder over the substrate prior to the part entering the powder cure oven 16 is necessary to prevent the fans in oven 16 from blowing the powder off of the part before the powder completes its flowout and begins to cross-link and cure. However, if the part surface is too hot in the coating booth 15, the powder may melt too freely and cause undesirable bubbles and paint runs. Preferably, the thickness of this powder coat should be from 2 to 4 mils after curing.

After leaving booth 15, the powder coated substrate 10 is then moved to the powder cure oven 16 which is heated to about the powder's cure temperature, e.g., around 290° F. +/ −10° F for the aforementioned preferred Courtalds powder. However, by the time the powdered substrate begins to enter oven 16, its surface temperature usually has fallen even more because of the lower ambient temperature of room 15 and the cooling effect of the powder coating. Thus, the powder coated substrate part 10 must remain long enough in cure oven 16 to have its surface temperature raised at least to the powder's cure temperature and be maintained at this level until a complete powder cure is effected. In the preferred process under description which uses the aforementioned Courtaids powder, the time spent by the part 10 in oven 16 should therefore range from about 26 minutes to 32 minutes in order to raise the part surface temperature to between 280° F.–300° F. and satisfactorily cure this powder coating, with an average oven cure time being about 28–29 minutes. Of course, variables such as different powder products and/or different cure oven temperatures can change the time needed by a part in the oven 16 to be cured. The humidity in the Spray Booth also should be held between 40% and 60% for best results; this can be achieved by adjusting the humidity of the Spray Booth surroundings.

SPECIFIC EXAMPLES

The following non-limiting examples show certain characteristics of plastic substrates that were electrostatically coated with powder over a water-based conductive paint in accordance with the present invention.

Example A

An unheated raw phenolic cellulosic substrate in the form of a toilet part, such as a cover or seat, and made of pine and hardwood sawdust with dry resin, was first coated with a water-based conductive paint (SPC 71-351) and subsequently heated in about a 355° F. oven for around 26–27 minutes to completely cure the conductive coating and degassify the substrate. Courtyards powder (FA050V White) was then electrostatically applied within one minute forty-five seconds from the substrate exiting the preheat oven to the conductive-coated substrate surface, which was at a temperature much less than the powder cure temperature but above the melting temperature of the powder. This powder coated substrate was subsequently placed in an oven at a temperature of about 280°–300° F. for around 29–30 minutes, where its surface was heated to around 280° F.–300° F. in order to completely cure the powder. After cooling, the powder-coated substrate, having a powder film thickness of about 3.5 mil, was rated as follows by two judges experienced in the trade: smoothness (reflecting the degree of grain raising) was 9.3; and chip resistance was 10 (scores are averages of these evaluations where "10" is the best possible score). Adhesion was measured by the industry standard cross-hatch adhesion method, and found to be 10. The powder coating gloss factor was also about 93.5% measured at the standard 60° angle from the vertical using a Gardner glossmeter. Consequently, the finish on this article was considered to be completely acceptable.

Example B

A raw unheated phenolic cellulosic composite substrate in the form of a toilet cover, made of pine and hardwood and resin, was coated at room temperature with a water-based conductive paint and then heated at about 355° F. for around 26–27 minutes to cure the paint. Thereafter, the painted substrate was electrostatically coated within two minutes from the part leaving the preheat oven with a Sheboygan powder product XHW-169. Curing of this powder coated substrate then took place in a 280°–300° F. oven for around 29–30 minutes. This finished toilet part exhibited an acceptable 82% gloss with acceptable smoothness, good holdout and somewhat broad but not objectionable orange peel. Holdout is a measure of how well striations in the wood-containing plastic substrate are covered or minimized by the powder coating. Orange peel refers to a textured surface somewhat like the skin of an orange and, while not particularly desirable, can still be present in a finished product of commercially acceptable quality.

Although the foregoing description has emphasized the use and advantages of a water-based conductive paint coating, a solvent-based conductive paint coating may be substituted therefor and still provide certain benefits. For example, a powder coating composition may also be applied over a solvent-based conductive coating when the substrate surface temperature is below the powder's cure temperature. In this case, however, a separate oven may have to be provided to cure the solvent-based conductive paint on the substrate, since this paint's cure temperature and time are substantially different from water-based paints. After such curing of the solvent paint, the solvent-coated substrate then could be put into the powder preheat oven 13 of FIG. 1 in order to heat it to the proper powder melt temperature for powder coating in booth 15 and subsequent curing in oven 16.

Example C

An unheated raw phenolic cellulosic substrate in the form of a toilet part, such as a cover or seat, and made of pine and hardwood sawdust with dry resin, was first coated with a suspension of carbon black in xylenes (SPC 42-220E, 45 weight percent solids, with small amounts of calcium carbonate and n-butyl acetate), and was subsequently heated in a powder preheat oven for around 26–27 minutes to completely cure the conductive coating and degassify the substrate. The temperature of the interior of the part was monitored by boring a hole in the part and placing a probe into the part. The surface temperature of the part was monitored with an infrared gun. The preheat oven temperature was set to 380°–410° F. In the preheat oven the interior of the part gradually increased to about 345° F.; the surface temperature of the part was about 390° F. throughout most of the time in the powder preheat oven.

The part was transferred directly from the preheat oven into the powder spray booth and a thermosetting epoxy polyester hybrid powder having a melt temperature of 140°–160° F. and a cure temperature of 280° F. (Courtaulds Coatings (Interpon®) of Houston, Tex., formulation fixed as Product No. FA050U) was sprayed onto the part. At the beginning of the powder spray, the surface temperature of the part was 250° F., and by the end of the powder spray the surface temperature had fallen to 228° F. The internal temperature of the part ranged from 125° down to 110° during application of the powder coat. After the powder coating was applied, the powder coated substrate was then transferred to the cure oven and heated at 290°–300° (surface temperature 280°–295° F.) for around 29–30 minutes. After cooling, the surface of the coated substrate was observed to be smooth without visible popping defects or cracking, and exhibited good adhesion.

Second Embodiment

Whether or not a conductive paint coating is on a substrate during its preheat degassing time in the powder preheat oven 13, the powder composition may also be immediately applied to the degassed substrate by appropriate means in powder room 14 if the substrate temperature is deliberately kept above the powder cure temperature during the entire time that the powder is applied. Preferably, the powder is thermosetting and is applied to the preheated substrate at a thickness from 2 to 4 mils. The powder coated substrate then is immediately moved to and heated in cure oven 16 at a temperature and for a time sufficient to cure the powder coated substrate. Consequently, after having been degassed in oven 13 at a temperature higher than the powder cure temperature, the plastic substrate during this second process embodiment is not allowed to cool below the powder cure temperature until the powder coating is actually cured. This variation in the previously described procedures can also be beneficial in controlling the extent of popping in a powder coated plastic substrate, particularly preformed fiber-reinforced plastic substrates that are susceptible to gassing upon heating, which include but are not limited to sheet molding compounds (SMC), bulk molding compounds (BMC), and phenolic cellulosic compounds.

In a preferred embodiment, toilet seats and covers are produced and provided with a powder coating, which is cured as described above, with the powder coating being applied either directly to the substrate or onto an aqueous or solvent-based conductive coating. Thus, a cured powder coating can be produced on a toilet seat and cover, while minimizing VOC emissions.

Many other modifications and variations of the present invention are possible considering the above teachings and specifications. Therefore, within the scope of the appended claims, the invention may be practiced otherwise than as specifically described above.

We claim:

1. A process of coating the surface of a plastic substrate comprising a cellulosic material, comprising of a steps of:

a) applying an electrically conductive coating to said surface of said substrate;

b) heating said substrate at a temperature above the cure temperature of the subsequently-applied power coating composition and for a time sufficient to cure said conductive coating and sufficient to degassify said plastic substrate;

c) applying a thermosetting powder coating composition over said cured conductive coating while the substrate surface temperature is below the temperature needed to cure said powder coating composition and above the temperature needed to melt said powder coating composition; and d) heating the powder coated substrate at a temperature and for a time sufficient to cure said powder coating composition; and wherein the coated substrate resulting from step d is without visible popping defects.

2. The process of claim 1, wherein said cellulosic material comprises a composite of cellulose and phenolic resin.

3. The process of claim 1, wherein said powder coating composition comprises a thermosetting epoxy polyester hybrid.

4. The process of claim 3, wherein during step b, the surface of the plastic substrate is heated to about 390° F. for at least about 26 minutes.

5. The process of claim 3, wherein during step c, the surface temperature of the substrate is between about 228° F. and about 250° F.

6. The process of claim 3, wherein during step d, the substrate is heated to a surface temperature of at least 280° F. for at least 30 minutes.

7. The process of claim 1 wherein, prior to step a, the plastic substrate is heated to a temperature above ambient temperature and below the temperature needed to cure the subsequently-applied powder coating composition.

8. The process of claim 1 wherein said process is accomplished without application of a metal-containing layer onto said substrate.

9. An article made by the process of claim 1.

10. A process of coating the surface of a plastic substrate comprising a cellulosic material, comprising the steps of:

a) applying an electrically conductive coating to said surface of said substrate;

b) heating said substrate at a temperature above the cure temperature of the subsequently applied powder coating composition and for a time sufficient to cure said conductive coating and sufficient to degassify said plastic substrate;

c) applying a thermosetting powder coating composition over said cured conductive coating while the substrate surface temperature is at lease 30° F. below the temperature needed to cure said powder coating composition, and above the temperature needed to melt said powder coating composition; and d) heating the powder coated substrate at a temperature and for a time sufficient to cure said powder coating composition.

11. The process of claim 10 wherein the plastic substrate comprises a preformed cellulosic phenolic substrate.

12. The process of claim 11 wherein said powder coating composition comprises a thermosetting epoxy polyester hybrid having a cure temperature of at least 280° F.

13. The process of claim 12 wherein step c is conducted between about 228° F. and about 250° F. and step d is conducted between abut 280° F. and about 300° F. for at least 30 minutes.

14. The process of claim 10 wherein, prior to step a, the plastic substrate is heated to a temperature above ambient temperature and below the temperature needed to cure the subsequently-applied powder coating composition.

15. An article made by the process of claim 10.

16. A toilet part comprised of a preformed phenolic cellulosic composite having at least a portion of its surface covered by a cured powder coating composition and wherein the portion of said toilet part's surface covered by a cured power coating composition is without visible popping defects.

17. The toilet part of claim 16, wherein said powder coating composition comprises a thermosetting resin.

18. The toilet part of claim 17, wherein said powder coating composition is an epoxy polyester hybrid.

* * * * *